United States Patent
Cummings et al.

(10) Patent No.: US 7,685,051 B2
(45) Date of Patent: Mar. 23, 2010

(54) SYSTEM FOR SETTLING OVER THE COUNTER TRADES

(75) Inventors: Raymond J. Cummings, Decatur, GA (US); David Goone, Glencoe, IL (US)

(73) Assignee: IntercontinentalExchange, Inc., Chicago, IL (US)

(*) Notice: Subject to any disclaimer, the term of this patent is extended or adjusted under 35 U.S.C. 154(b) by 2034 days.

(21) Appl. No.: 10/444,324

(22) Filed: May 23, 2003

(65) Prior Publication Data

US 2003/0225681 A1    Dec. 4, 2003

Related U.S. Application Data

(60) Provisional application No. 60/385,337, filed on May 31, 2002.

(51) Int. Cl.
G06Q 40/00 (2006.01)
(52) U.S. Cl. ...................................... 705/37
(58) Field of Classification Search ............. 705/35–45
See application file for complete search history.

(56) References Cited

U.S. PATENT DOCUMENTS

| | | |
|---|---|---|
| 3,581,072 A | 5/1971 | Nymeyer |
| 4,674,044 A | 6/1987 | Kalmus et al. |
| 4,677,552 A | 6/1987 | Sibley, Jr. |
| 4,903,201 A | 2/1990 | Wagner |
| 4,953,085 A | 8/1990 | Atkins |
| 4,980,826 A | 12/1990 | Wagner |
| 5,003,473 A | 3/1991 | Richards |
| 5,077,665 A | 12/1991 | Silverman et al. |
| 5,101,353 A | 3/1992 | Lupien et al. |
| 5,126,936 A | 6/1992 | Champion et al. |
| 5,136,501 A * | 8/1992 | Silverman et al. ............. 705/37 |
| 5,168,446 A | 12/1992 | Wiseman |
| 5,193,056 A | 3/1993 | Boes |
| 5,258,908 A | 11/1993 | Hartheimer et al. |
| 5,270,922 A | 12/1993 | Higgins |
| 5,285,383 A | 2/1994 | Lindsey et al. |
| 5,297,031 A | 3/1994 | Gutterman et al. |
| 5,396,552 A | 3/1995 | Jahn et al. |
| 5,446,885 A | 8/1995 | Moore et al. |
| 5,517,406 A | 5/1996 | Harris et al. |
| 5,557,517 A | 9/1996 | Daughterty, III |
| 5,594,639 A | 1/1997 | Atsumi |
| 5,630,127 A | 5/1997 | Moore et al. |
| 5,802,499 A | 9/1998 | Sampson et al. |
| 5,819,237 A | 10/1998 | Garman |

(Continued)

FOREIGN PATENT DOCUMENTS

EP    0 512 702    11/1992

(Continued)

*Primary Examiner*—Jagdish N Patel
*Assistant Examiner*—Kevin Poe
(74) *Attorney, Agent, or Firm*—DLA Piper LLP (US)

(57) ABSTRACT

A system for automatically determining a trade settlement pathway comprising: receiving trade pathway preferences from a first and second party with respect to each other; wherein the trade is settled through clearing if both parties have available accounts with a clearing firm and the trade satisfies each party's clearing account credit limitations; and wherein the trade is settled bilaterally if at least one party does not have an available clearing account or both parties prefer to settle the trade bilaterally, and the trade satisfies each party's bilateral credit limitations.

37 Claims, 7 Drawing Sheets

U.S. PATENT DOCUMENTS

| | | | |
|---|---|---|---|
| 5,845,266 | A | 12/1998 | Lupien et al. |
| 5,873,071 | A | 2/1999 | Ferstenberg et al. |
| 5,905,974 | A | 5/1999 | Fraser et al. |
| 5,915,209 | A | 6/1999 | Lawrence |
| 5,924,082 | A * | 7/1999 | Silverman et al. ............. 705/37 |
| 5,940,810 | A | 8/1999 | Traub et al. |
| 5,950,175 | A | 9/1999 | Austin |
| 5,950,176 | A | 9/1999 | Keiser et al. |
| 6,012,046 | A | 1/2000 | Lupien et al. |
| 6,014,627 | A | 1/2000 | Togher et al. |
| 6,014,643 | A | 1/2000 | Minton |
| 6,076,074 | A * | 6/2000 | Cotton et al. ................. 705/40 |
| 6,098,051 | A | 8/2000 | Lupien et al. |
| 6,134,600 | A | 10/2000 | Liu |
| 6,157,918 | A | 12/2000 | Shepherd |
| 6,304,858 | B1 | 10/2001 | Mosler et al. |
| 6,317,727 | B1 | 11/2001 | May |
| 6,343,278 | B1 * | 1/2002 | Jain et al. ................. 705/36 R |
| 6,519,574 | B1 | 2/2003 | Wilton et al. |
| 6,876,982 | B1 * | 4/2005 | Lancaster ................... 705/37 |
| 2002/0004776 | A1 * | 1/2002 | Gladstone .................... 705/37 |
| 2002/0007335 | A1 * | 1/2002 | Millard et al. ................ 705/37 |
| 2002/0082976 | A1 * | 6/2002 | Howorka ..................... 705/37 |
| 2002/0116304 | A1 * | 8/2002 | Casper et al. ................. 705/35 |
| 2002/0116314 | A1 * | 8/2002 | Spencer et al. ................ 705/37 |
| 2002/0178102 | A1 * | 11/2002 | Scheinberg et al. ........... 705/37 |
| 2003/0033239 | A1 * | 2/2003 | Gilbert et al. ................. 705/37 |
| 2003/0050879 | A1 * | 3/2003 | Rosen et al. .................. 705/35 |
| 2003/0135398 | A1 * | 7/2003 | Groz ............................. 705/7 |
| 2004/0019553 | A1 * | 1/2004 | Setz et al. ..................... 705/37 |
| 2005/0165670 | A1 * | 7/2005 | Woodmansey et al. ........ 705/37 |
| 2006/0112002 | A1 * | 5/2006 | Holland et al. ................ 705/37 |
| 2007/0219882 | A1 * | 9/2007 | May ............................ 705/35 |

FOREIGN PATENT DOCUMENTS

| | | |
|---|---|---|
| WO | WO 9506918 | 3/1995 |
| WO | WO 9605563 | 2/1996 |
| WO | WO 9634357 | 10/1996 |
| WO | WO 9703409 | 1/1997 |

* cited by examiner

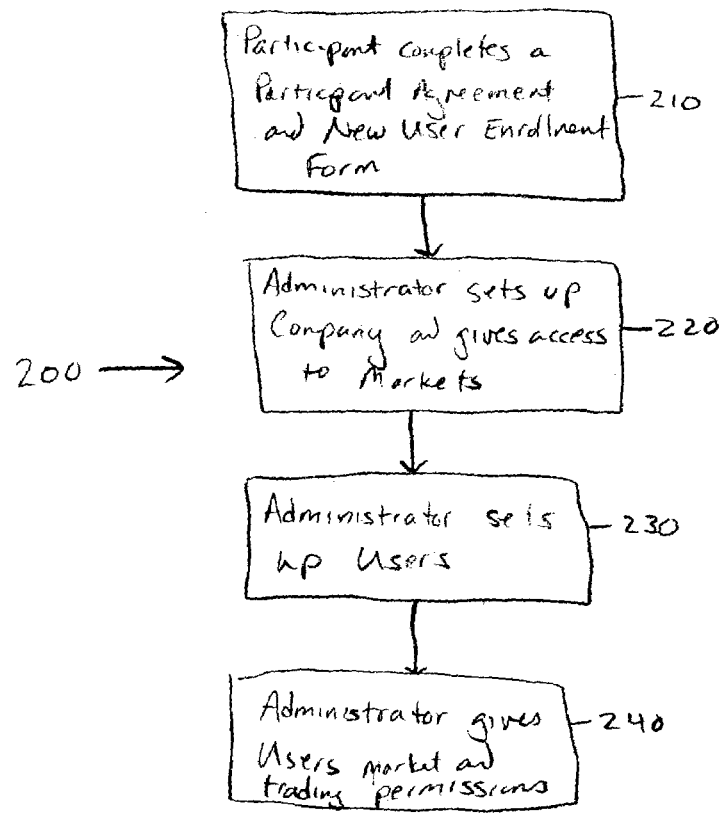
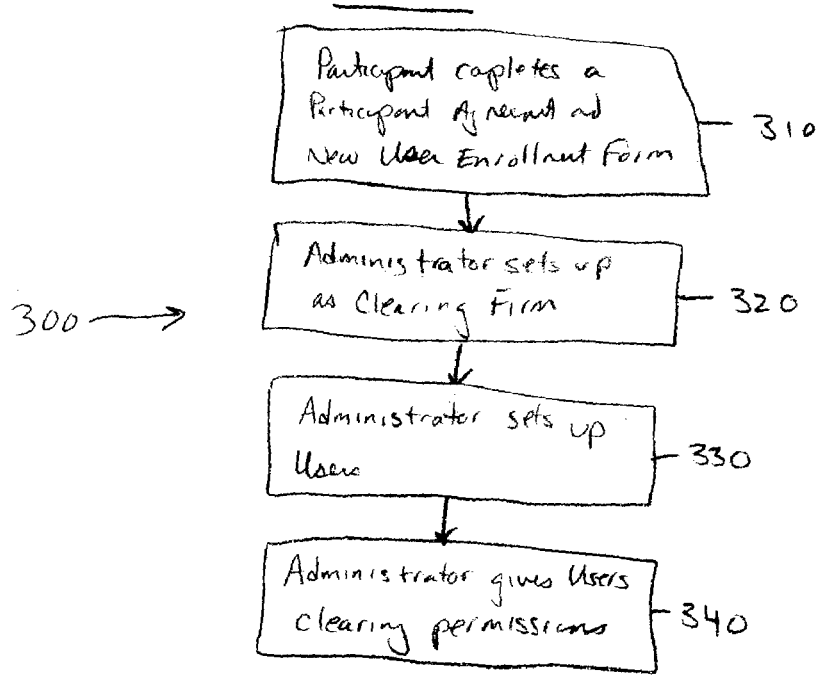

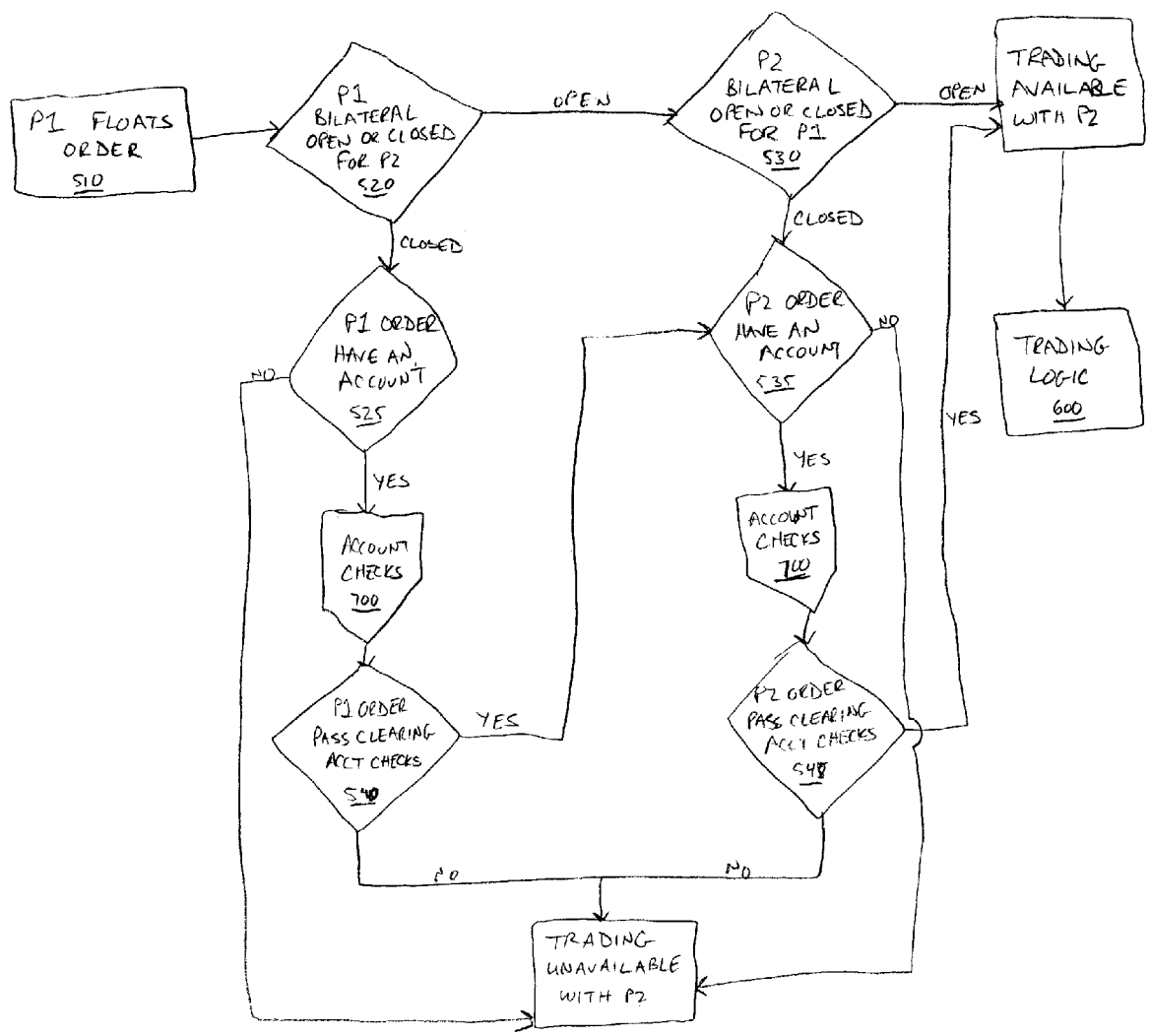

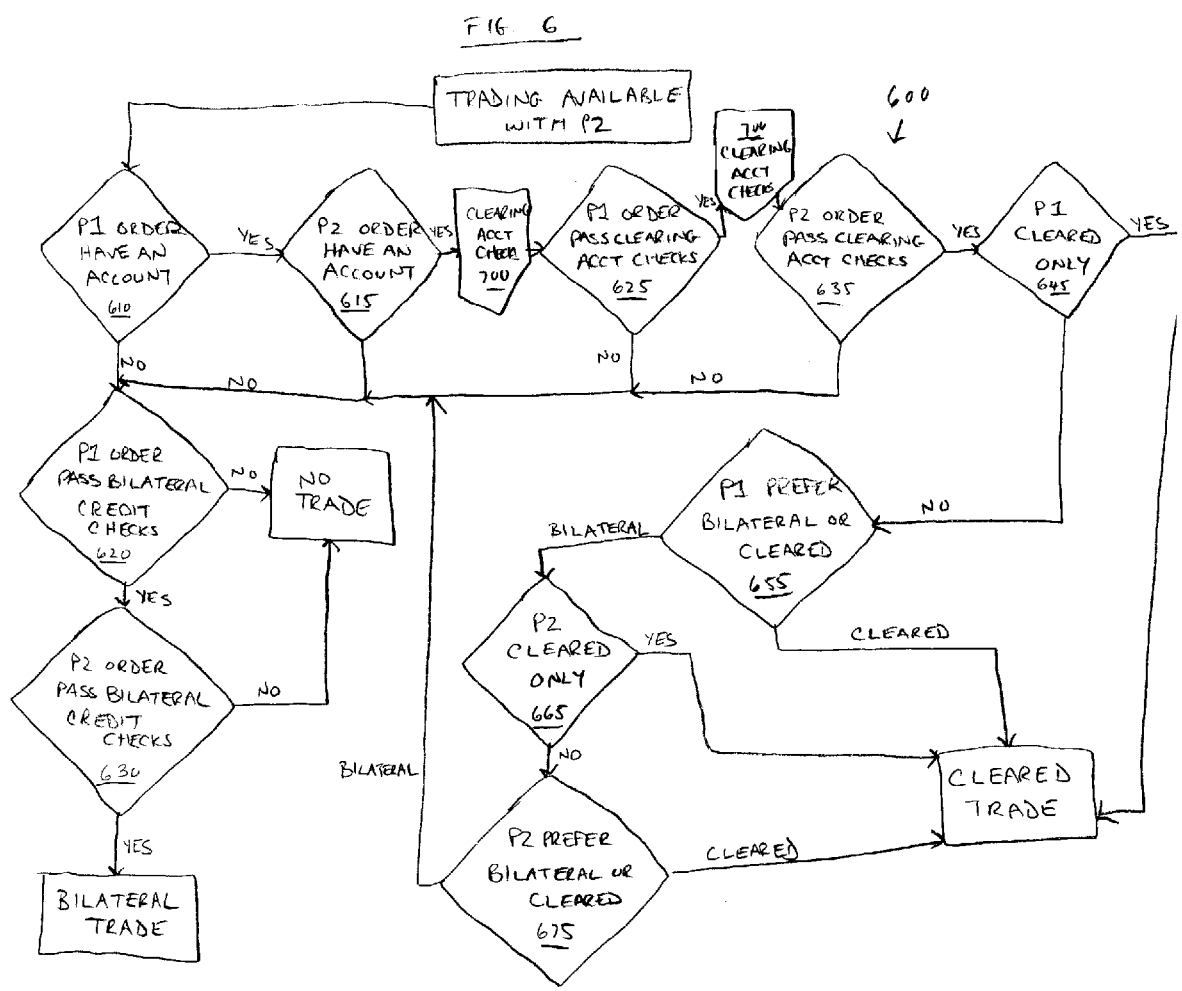

SYSTEM FOR SETTLING OVER THE COUNTER TRADES

This application claims priority from U.S. provisional application Ser. No. 60/385,337, filed May 31, 2002.

BACKGROUND OF THE INVENTION

1. Field of the Invention

The present invention relates to an electronic trading system. Particularly, the present invention is directed to a system for trading instruments, such as over the counter instruments or futures contracts, on an electronic exchange wherein trades are settled either bilaterally or cleared based on participant preferences.

2. Description of Related Art

The present invention relates generally to the trading of instruments such as over the counter instruments and futures contracts. Generally, such trades are arranged through bilateral contracts, i.e., the exchange of written agreements between counterparties. Recently, electronic markets have arisen to facilitate the trading of these instruments. In some circumstances, the trades may be consummated automatically if each counterparty informs the exchange of predetermined credit limitations, and the counterparties satisfy each other's respective limitations. While this method has generally been effective, the increased popularity of trading in these instruments (especially electronically) has created a need for more conventional trading method involving clearing trades through a third party clearinghouse.

Each method of trading, bilateral and cleared, has its own advantages. Bilateral trades are often favored where the parties have a pre-existing bilateral netting agreement, or where clearing a trade may be more expensive. On the other hand, it may be preferable to clear trades through a clearinghouse when one of the parties has reservations concerning the other party's credit worthiness and wishes to have the trade guaranteed by a third party. Current electronic exchanges have not accounted for these preferences. Therefore, there is a need for a system on an electronic exchange in which participants may set preferences to trade either bilaterally or cleared depending upon the circumstances. There is also a need for a system in which the exchange will automatically default to a preferred trading method. It is also desirable to show the products being traded in a single price stream, regardless of how the trade is settled. Thus, the details of the trade (e.g., price, quantity, etc.) should not be affected by the method of settlement. The method of settlement will only be determined at the time of trade confirmation. This system will streamline electronic trading of the products being traded.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, an embodiment of the invention includes a trading system for trading financial instruments on an electronic exchange involving bilateral and cleared trading, the system comprising:

receiving respective trading preferences from a first participant and a second participant relative to each other, wherein said trading preferences comprise bilateral only, cleared only, preferred bilateral, preferred cleared, or closed;

receiving respective bilateral credit limits from the first and second participants relative to each other if bilateral trading is possible between the first and second participants, the bilateral credit limits comprising daily dollar limits and tenor limits;

establishing a first and second clearing account between each of the first and second participants and one or more clearing firms, respectively, if cleared trading is possible, wherein each clearing account has a clearing account setting of open or closed for each of the first and second participants relative to each other; and effecting a cleared trade between the first and second participants if:
  (a) the first participant has a trading preference for the second participant as cleared only or preferred cleared and the second participant has the second clearing account open with respect to the first participant, or
  (b) the first participant has the first clearing account open with respect to the second participant and a trading preference for second participant as preferred bilateral and the second participant has a trading preference with respect to the first participant as cleared only or preferred cleared with the second clearing account open;

refusing a trade between the first and second participant if:
  (a) the first participant or the second participant has a trading preference of closed with respect to the other,
  (b) the first participant has a trading preference of cleared only and the second participant has a trading preference of bilateral only or preferred bilateral with the second clearing account closed, or
  (c) the first participant has a trading preference of bilateral only and the second participant has a trading preference of cleared only; and effecting a bilateral trade between the first and second participant if the trade is not refused or cleared and the trade satisfies the first and second parties' respective bilateral credit limits.

Embodiments of the foregoing system have the advantage that they can be embodied in a user interface able to facilitate electronic trading, as described herein below.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

FIG. 4A is a user interface used in connection with an embodiment of the invention.

FIG. 4B is a user interface used in connection with an embodiment of the invention.

FIG. 4C is a user interface used in connection with an embodiment of the invention.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

The methods and systems presented herein may be used for electronic trading of financial instruments, such as over the counter instruments or futures contracts. The present invention is particularly suited for electronic trading of such instruments wherein a participant on an electronic exchange has predetermined preferences concerning settlement with specific counterparties.

Figure 1:
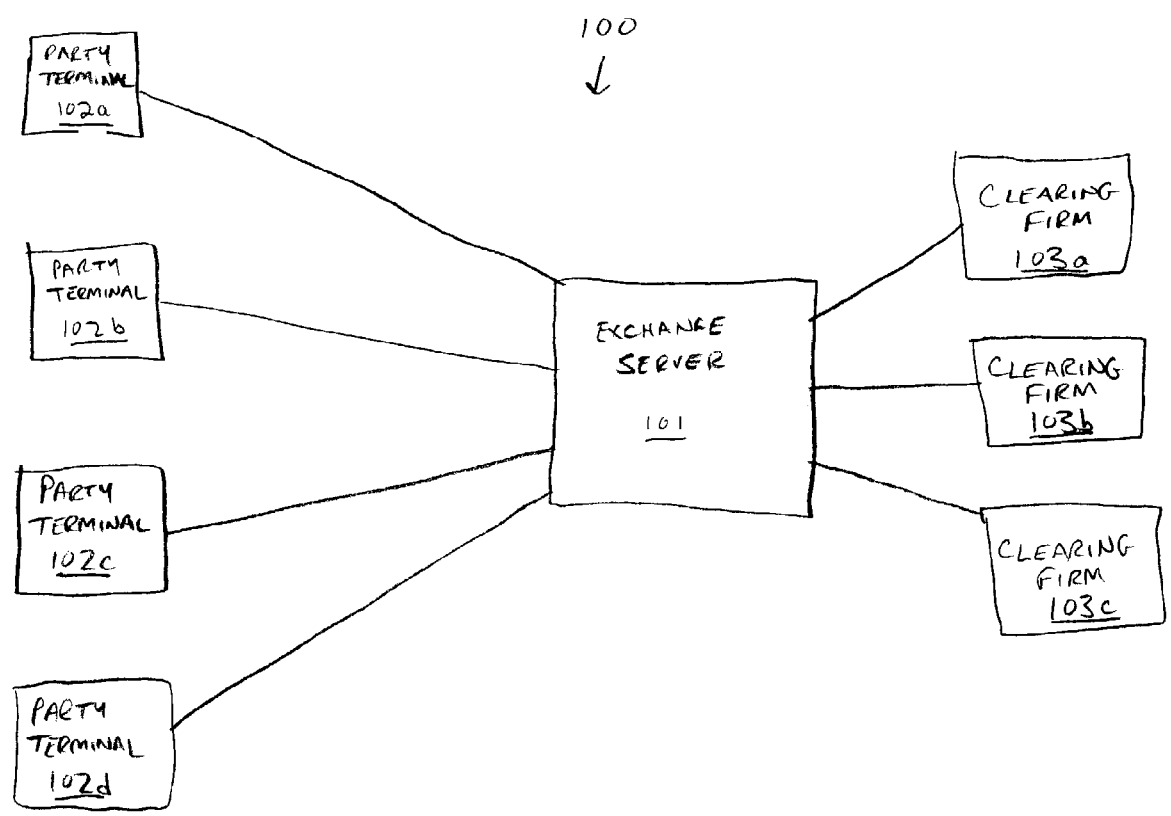
FIG. 1 is a schematic representation of the components of an embodiment of the system in accordance with the invention.

Electronic over the counter trading systems are shown generally in FIG. 1. Such a system 100 generally includes an exchange server 101 operated by the exchange. One such exchange, for exemplary purposes, is provided by the Intercontinental Exchange, Inc. In electronic communication with the exchange server 101 are multiple trading parties operating through party terminals 102a through 102d. Although only four party terminals are herein depicted, it should be clear that the system 100 is not limited to four party terminals and will usually have hundreds, if not more, party terminals 102. Indeed, the more parties trade on the exchange, the more successful the exchange will be. Finally, the exchange server 101 may be linked to one or more clearing firms 103a through 103c. Again, the system is not limited to the number of clearing firms 103 depicted in FIG. 1, but instead should be understood to comprise as many or as few clearing firms as have agreed to clear trades made on the exchange. Other computers or terminals may be included in the system 100 for performing a variety of other functions desirable in an electronic trading system (such as trade matching). It should also be understood that the trading system 100 will be operational regardless of the methods by which the various parties or clearing firms are linked to the exchange server 101, such as by modem, serial cable connection, wireless connection, or other telecommunications link known in the art or hereafter developed.

The present embodiments of the invention require first that the parties be set up to take advantage of the exchange. This process is described generally at FIGS. 2 through 4. It should be noted that the process for setting up the parties can vary depending upon the business needs of the exchange and are not necessarily related to the settlement logic which is at the heart of the present invention.

Figure 2:
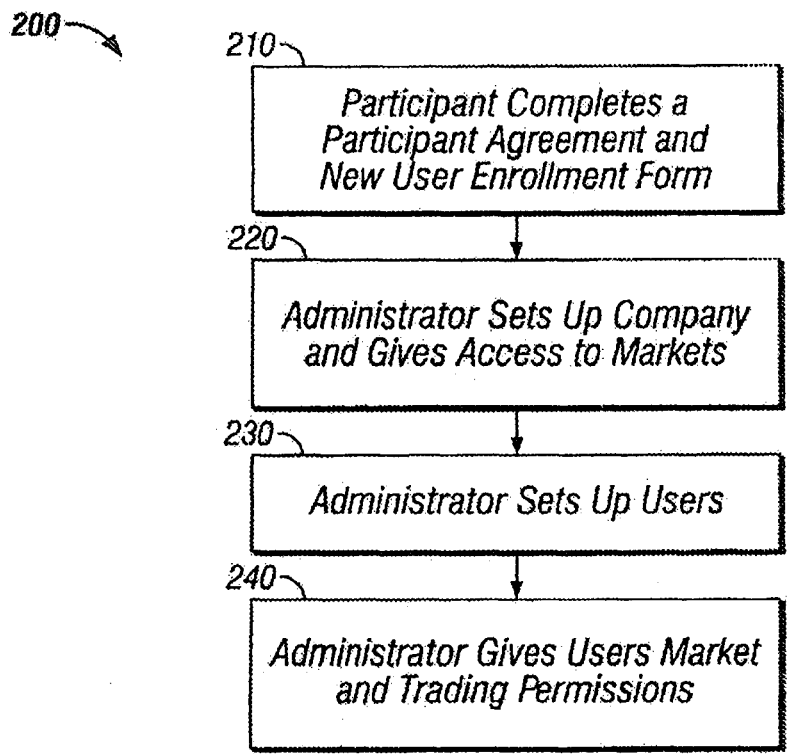
FIG. 2 is a schematic representation of a procedure for setting up an account to trade in accordance with an embodiment of the present invention.

FIG. 2 represents the set-up process 200 for a participant on the exchange who is involved in trading. The participant first completes a Participant Agreement and New User Enrollment Form 210. These forms are typically legal documents by which the participant agrees to the terms and conditions governing use of the exchange. The documents (which may be executed on line or in paper form) may also identify the various persons or entities having responsibilities or obligations, such as the participant's Administrator, contact information, or subsidiary companies that will be trading on the exchange under rights granted to the participant. For example, therefore, a company may execute a single Participant Agreement to allow trading for multiple subsidiary companies whose accounts will be managed by a single participant employee (e.g., the Administrator, or a Risk Manager, to be explained further below). In the second step 220, the Administrator gives the participant access to markets in which the customer will be trading. In practice, the exchange may have multiple markets relating to the types of instruments traded, such as energy markets, commodity markets, equity markets, etc. In the next step 230, the Administrator sets up each particular user. The user may be an individual or an entity with rights under the Participant Agreement. In this step, the Administrator identifies to the exchange what each user may or may not do. For example, some users may have trading privileges, others may have viewing privileges. A particular user may also be identified as the Risk Manager, whose role is defined further in reference to FIG. 4. Finally, the Administrator gives the users permissions 240. Thus, for example, some users will be permitted to trade in one market, but not others.

Figure 3:
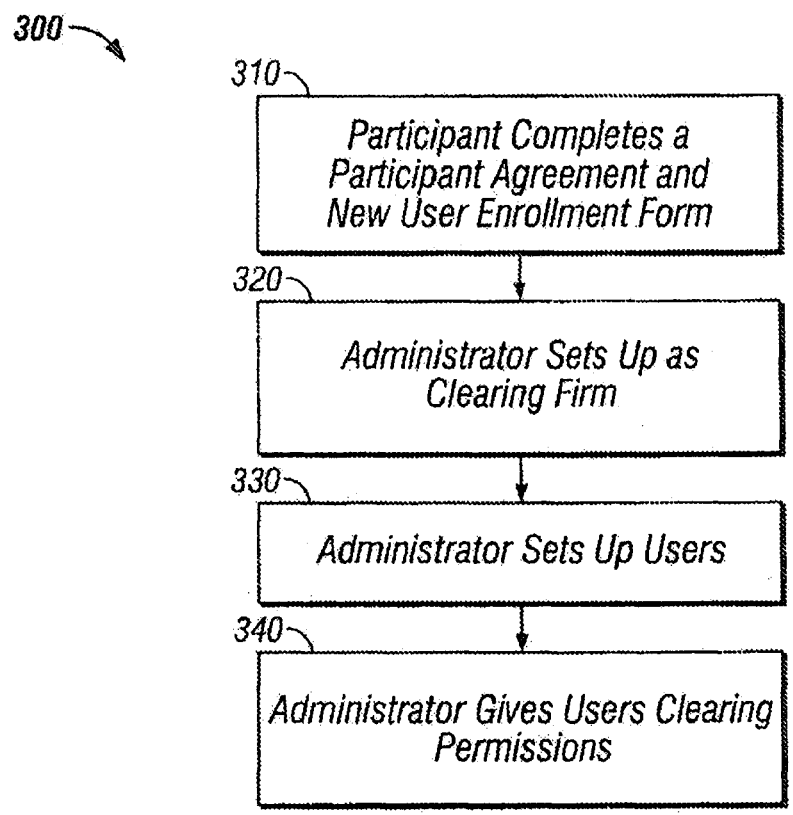
FIG. 3 is a schematic representation of another procedure for setting up an account to trade in accordance with an embodiment of the present invention.
Figure 4:
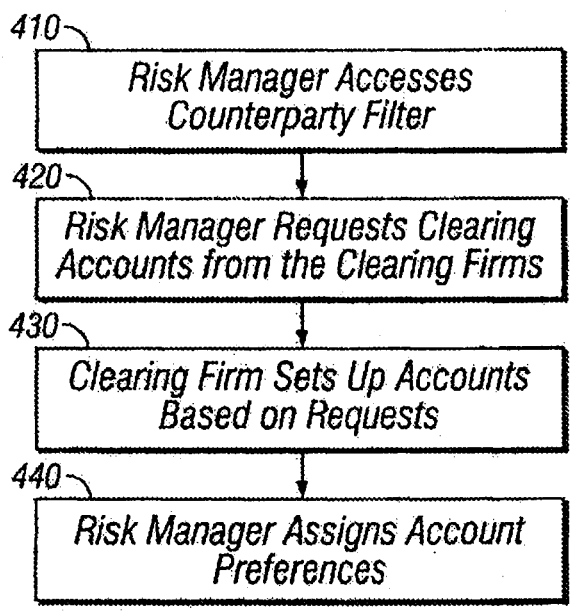

FIG. 3 represents the set-up process 300 for a participant on the exchange who is involved in trading by clearing trades, that is, for participants that are clearing firms. In addition to the process 200 set forth in FIG. 2, the clearing firm goes through the process 300 required to establish a clearing relationship with the participants on the exchange. The process is similar to the process for setting up a trading participant 200, except the process 300 is focused on setting up clearing permissions. Thus, after a clearing firm has executed the necessary agreements 310, the Administrator tells the exchange that the participant is a clearing firm 320. The Administrator will set up users 330 who will have authority to clear trades, and will finally give users their specific clearing permissions (e.g., market or value specific criteria for clearing trades) 340.

Figure 4:
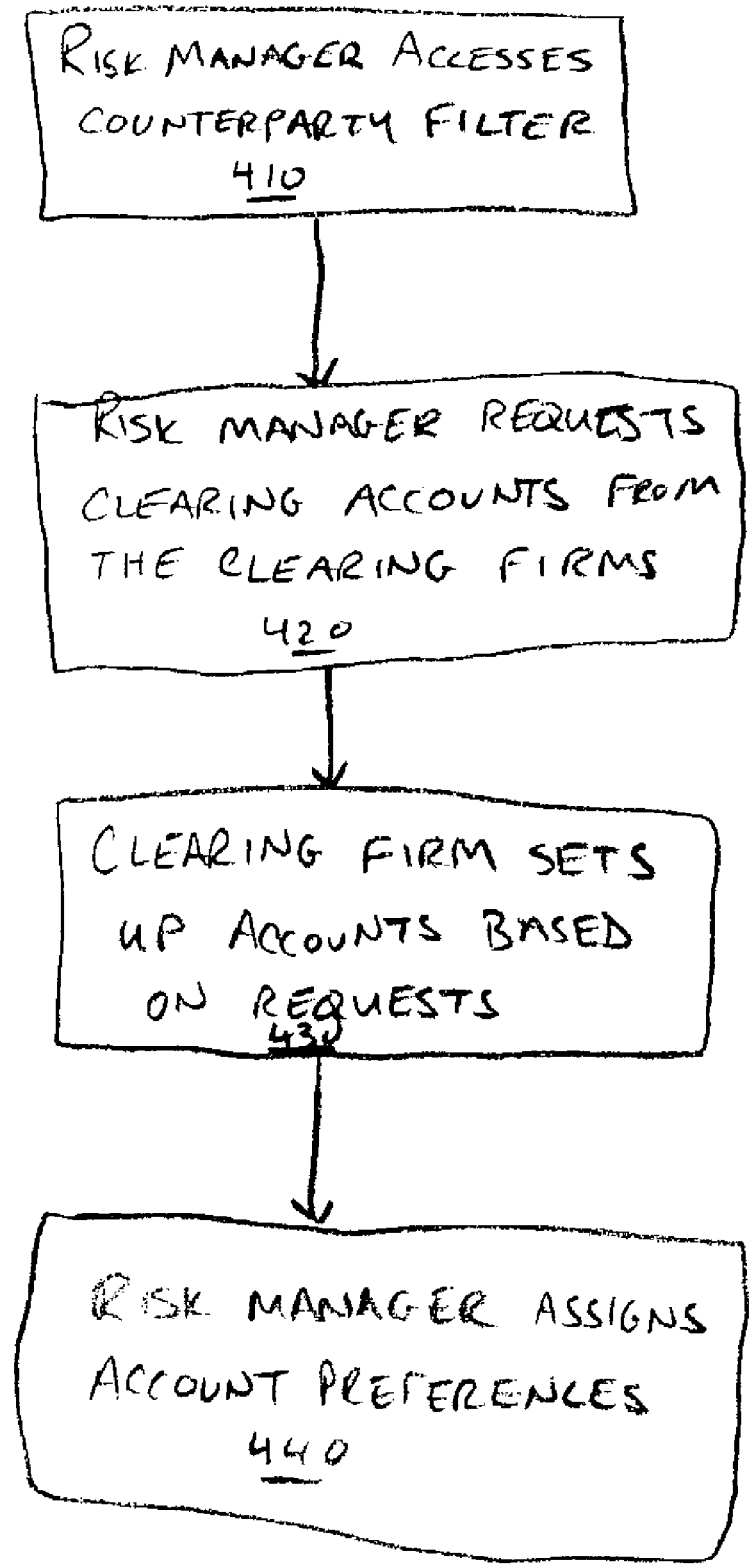
FIG. 4 is a schematic representation of a procedure for setting up accounts to trade cleared in accordance with an embodiment of the invention.
Figures 4A, 4B, 4C:
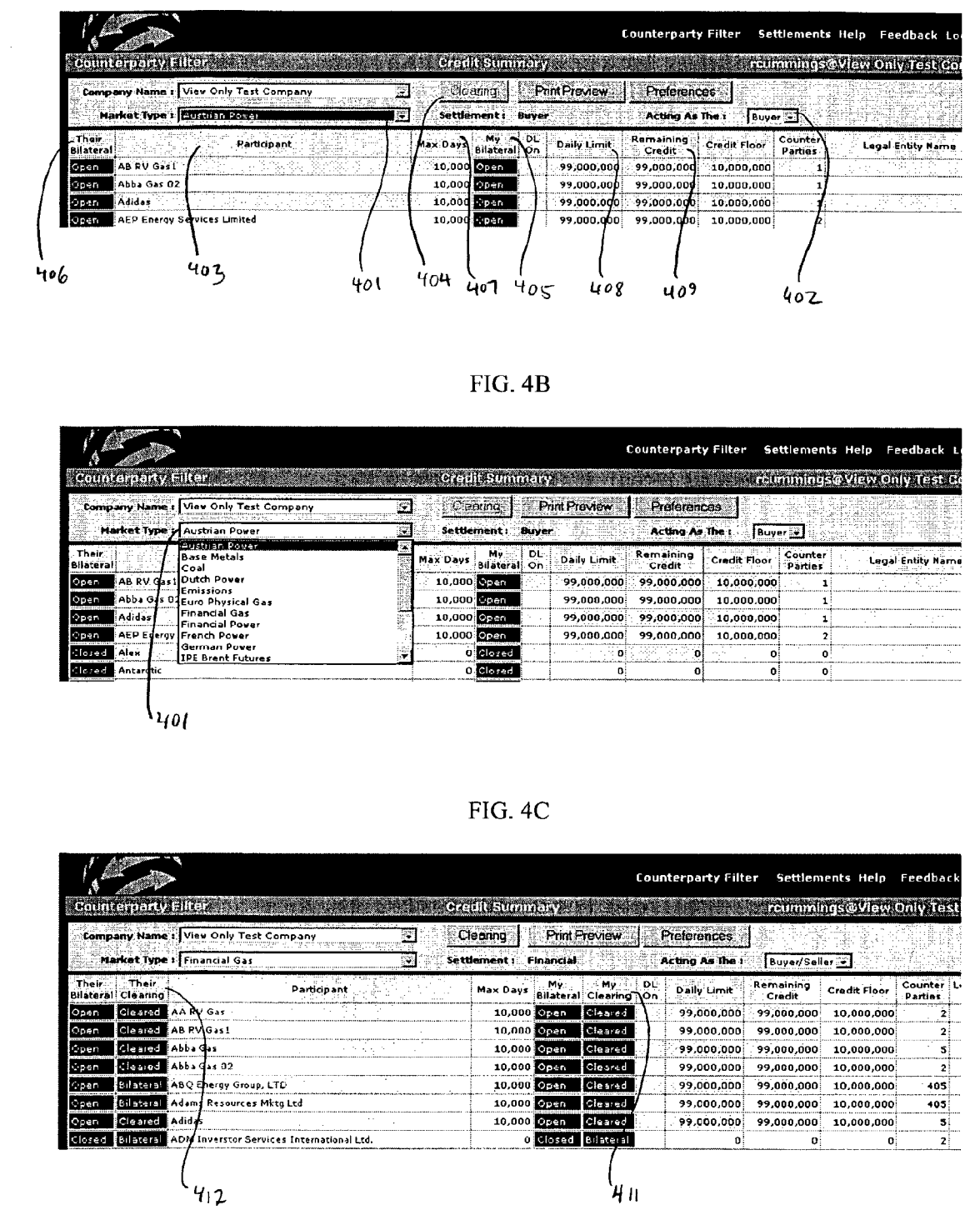

FIG. 4 and associated FIGS. 4A-C represent the process by which a Risk Manager and Clearing Administrator establish clearing accounts for particular traders, counterparties and markets. It should be understood that the screen shots depicted in FIGS. 4A-C represent preferred embodiments of the user interfaces of the present system.

According to the method 400, the Risk Manager logs into a counterparty filter 410. The counterparty filter is depicted in FIGS. 4A-4C. In FIG. 4A, the counterparty filter identifies the market which the Risk Manager has selected in Market Type tab 401. The Risk Manager selects his company's role in that market, i.e., buyer or seller, from tab 402. It will be understood that one skilled in the art might use drop down menus for each of the required tabs. For the selected market type and role, all of the participants are listed in the Participant column 403. In the Market Type selected in FIG. 4A, clearing is not available, and thus the clearing button 404 is disabled. Because clearing is unavailable, trades must be settled bilaterally in this Market Type. Accordingly, the counterparty filter identifies whether the company has identified the participant as a participant with which the company will trade bilaterally in this market (see "My Bilateral" column 405). Similarly, the "Their Bilateral" column 406 identifies whether the applicable counterparty permits bilateral trading with the Risk Manager's company. In the preferred embodiment, the term "open" is used to denote available bilateral trading, and "closed" is used when such trading is unavailable. Bilateral trades can only be executed when each party's bilateral preference is "open" with respect to the other. In addition, bilateral trading will occur when the parties are able to meet each other's respective credit limits. Thus, the counterparty filter identifies the tenor limits (i.e., Max Days) for the instrument being traded 407, and the Daily Dollar Limit 408 for trades with that counterparty. In the case depicted in FIG. 4A, a trade between Test Company and Adidas for an instrument having a term exceeding 10,000 days or a notional value exceeding $99,000,000 will be rejected. Also, because the Daily Dollar Limits 408 are cumulative for the trading day, a trade having a notional value of, for example, $50,000,000 will be rejected if the two parties have already traded in excess of $49,000,000 in notional value that day.

In FIG. 4B, the Risk Manager selects another Market Type from the menu 401. In FIG. 4C, the Risk Manager has selected a Market Type where clearing is available. Thus, the counterparty filter additionally identifies each party's clearing preference with respect to the other 411, 412. Based upon this screen, it can be seen whether trades will be executed bilaterally, cleared, or not at all. If both parties prefer cleared trades with respect to each other, the trade will default to cleared. If both parties have clearing capabilities, and if one party prefers cleared but the other party prefers bilateral, the trade will default to cleared. In the preferred embodiment, the trade will default to bilateral in the event both parties have clearing capabilities only if both parties prefer bilateral.

In the next step 420, the Risk Manager requests clearing accounts from the clearing firms of his choice. This process is preferably accomplished through an electronic interface. The Risk Manager will send a request to the Clearing Account Manager requesting access to one or more of the company's clearing accounts with the clearing firm. The Clearing Account Manager may access a screen which identifies all of the requests for accounts and may respond by making one or more of the accounts available for trading. Typically, the company has a pre-existing relationship with clearing firms for trading, and one or more of those pre-existing accounts is used. Once access has been given to a clearing account, the Risk Manager may edit and view trader profiles (i.e., trading profiles for users under the Risk Manager's authority). This may include assigning accounts to particular traders.

Figure 7:
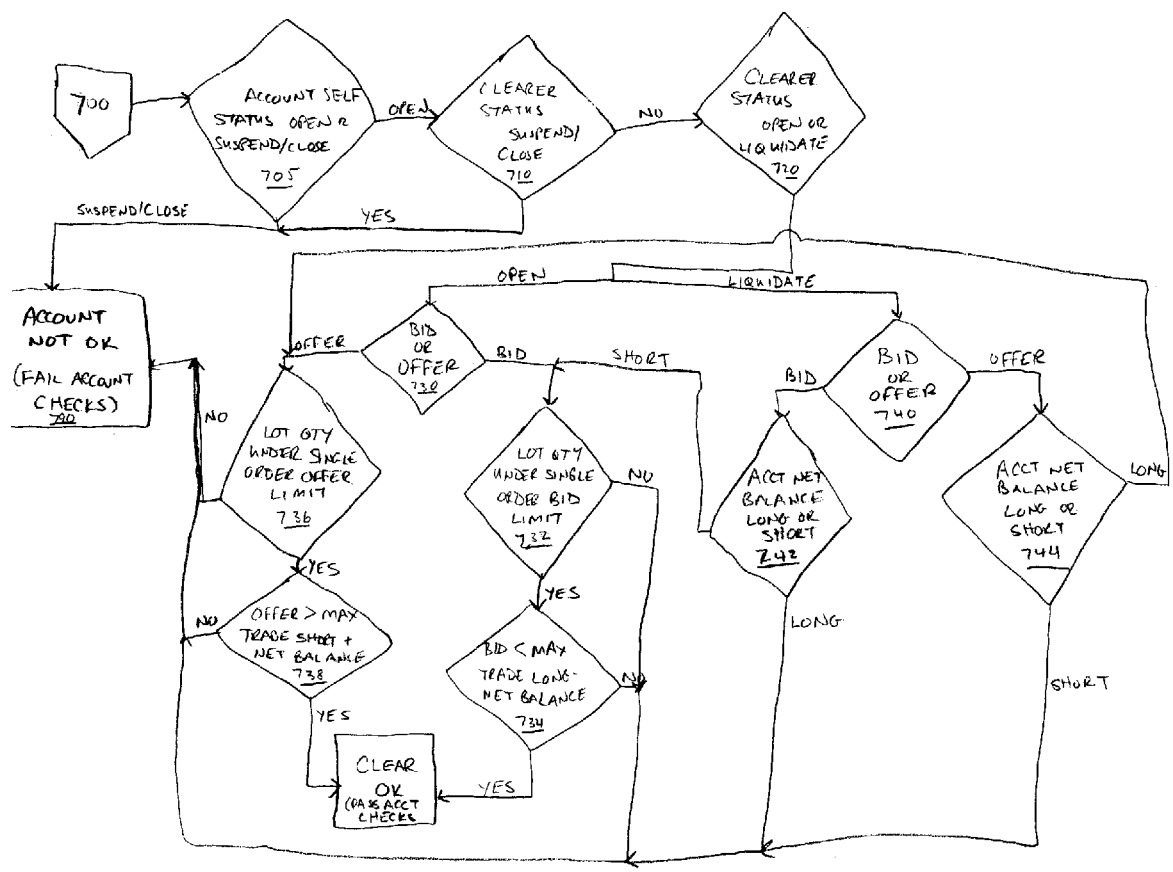
FIG. 7 is schematic representation of clearing account checks in accordance with an embodiment of the invention.
Figure 1:
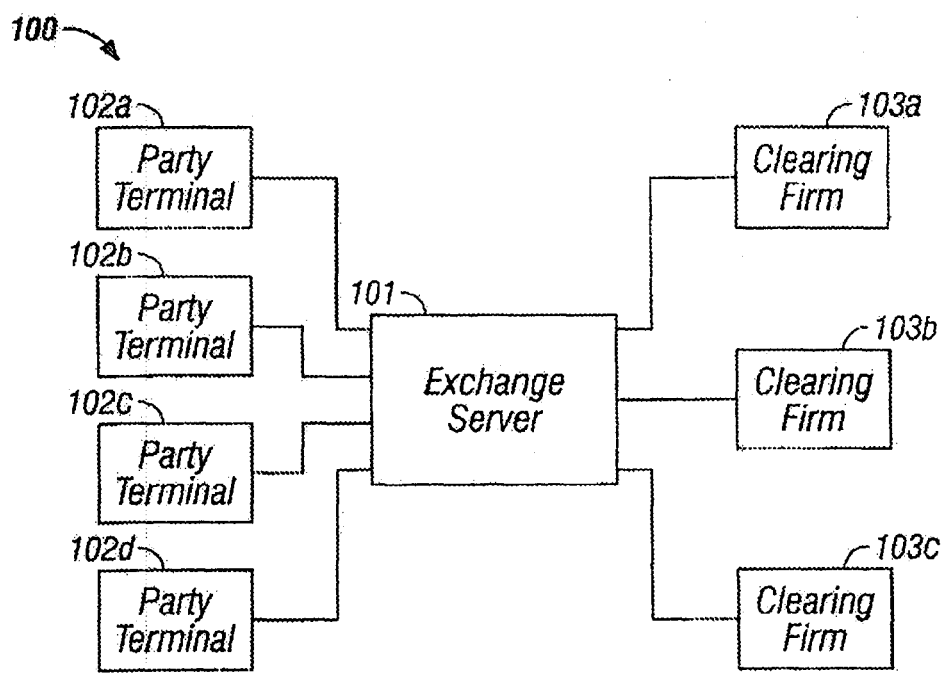
Figure 5:
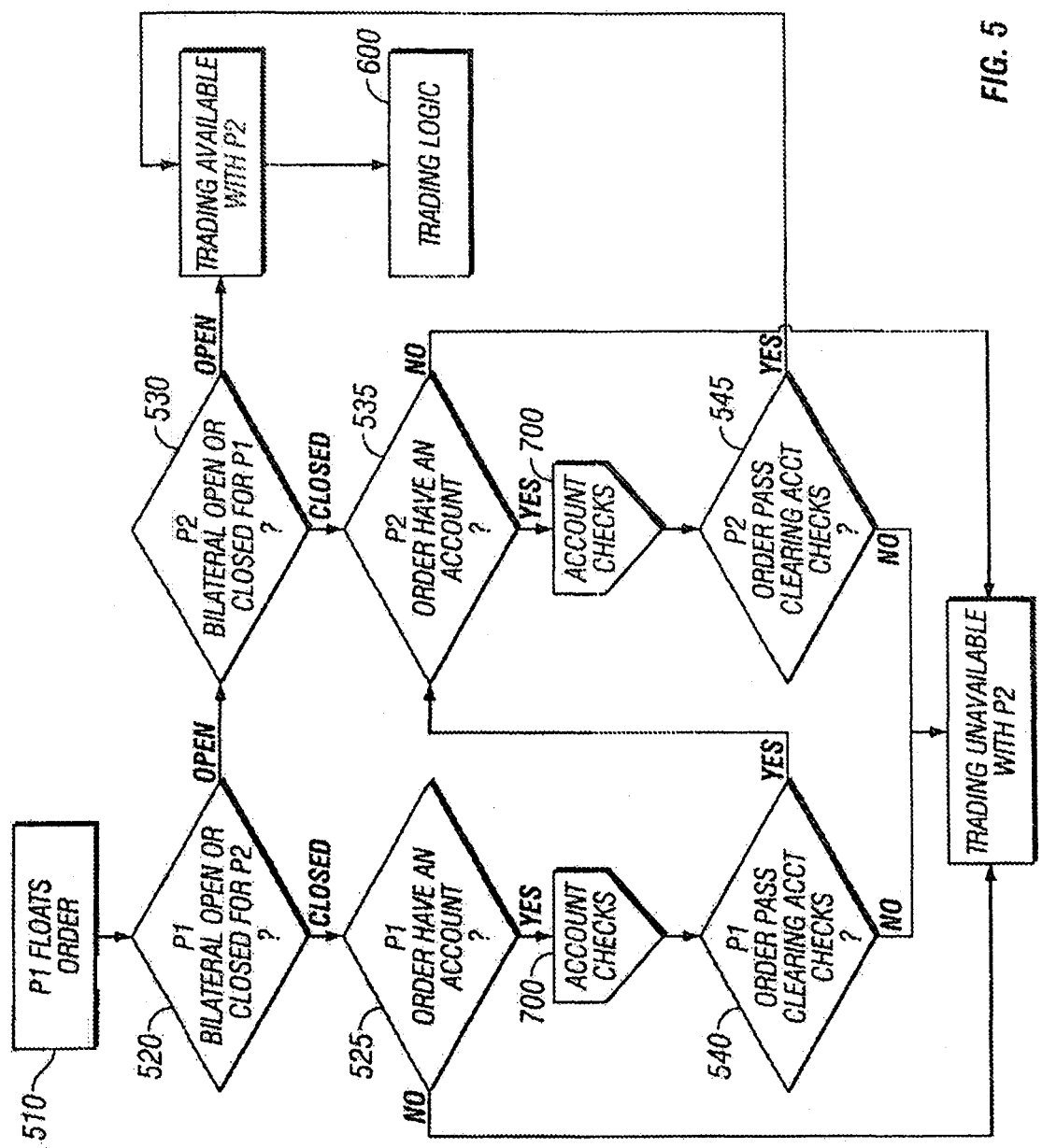
FIG. 5 is schematic representation of a trading pathway in accordance with an embodiment of the invention.
Figure 6:
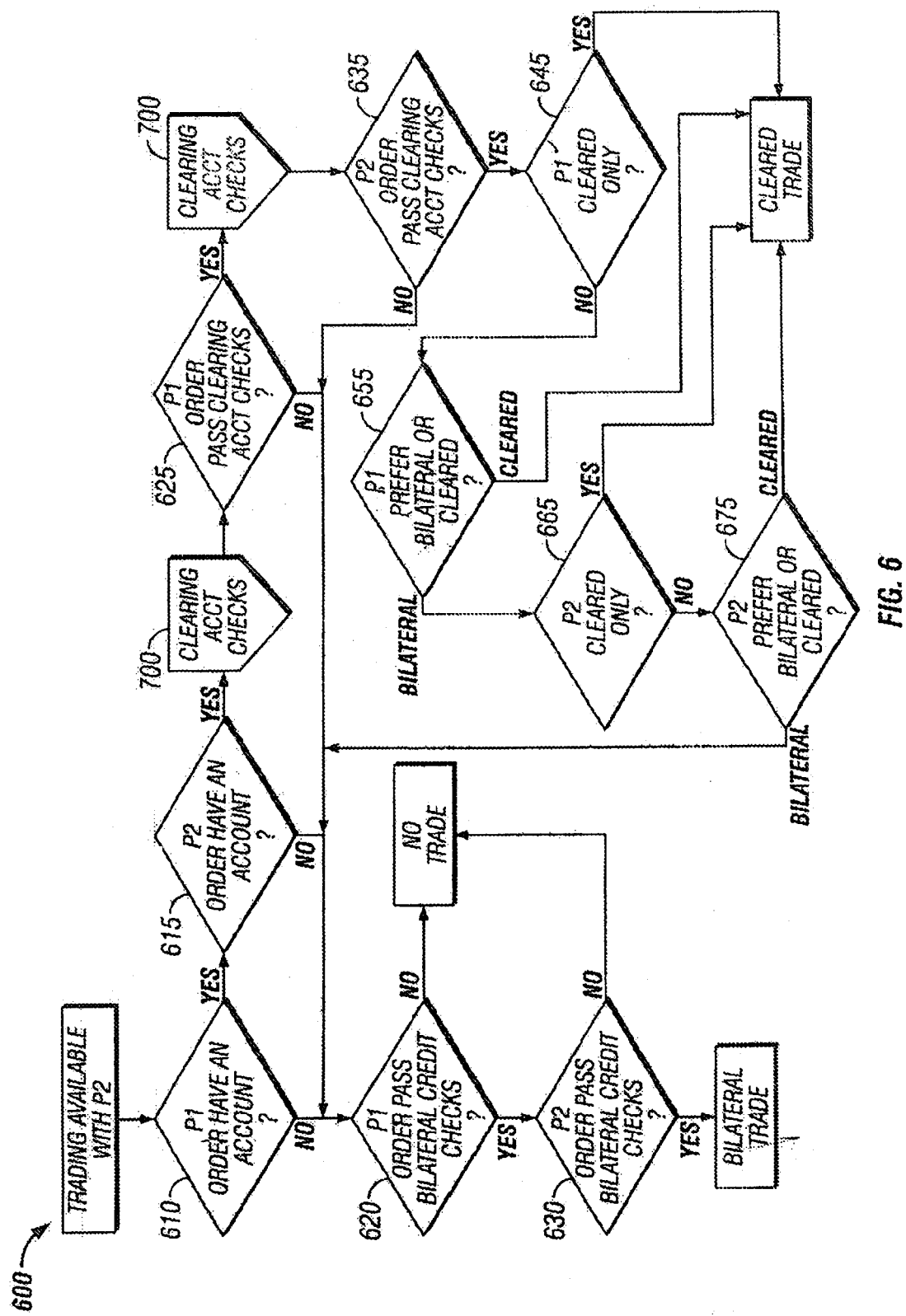
FIG. 6 is schematic representation of a further trading pathway in accordance with an embodiment of the invention.
Figure 7:
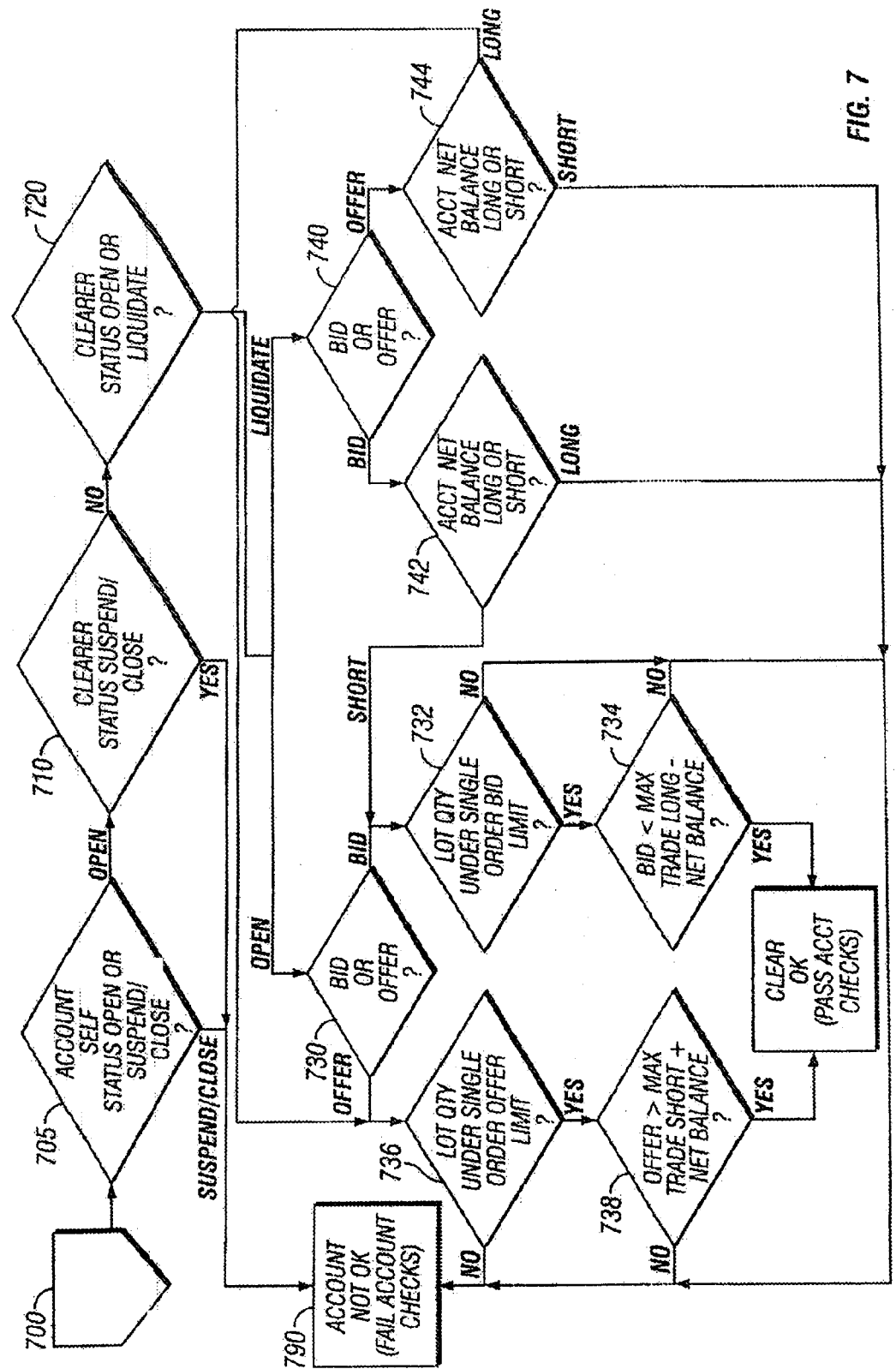

The trading process according to the preferred embodiments of the present invention is depicted in the flow charts shown in FIGS. 5-7. In FIG. 5, it is determined first whether trading is available between counterparties, P1 and P2. If trading is available between P1 and P2, the trading logic is depicted in FIG. 6. The clearing account checks are depicted in FIG. 7.

According to FIG. 5, in the preferred embodiment, the first party, P1, floats an order to the exchange 510. In the preferred embodiment, this involves selecting a market the party wants to trade in, navigating to an order entry screen, entering the economic details of the transaction, selecting a clearing account, and floating the order (either bid, offer or both). The order is received by prospective counterparty, P2, who decides to attempt to consummate a trade on the terms of the order floated by P1. The first determination 520 is whether P1 permits bilateral trading with P2, i.e., is bilateral trading "open" or "closed" with P2. If bilateral trading is open with P2, the next inquiry 530 is whether P2 has bilateral trading open or closed with P1. If both P1 and P2 have bilateral trading available with each other, trading is available (at least on a bilateral basis) and the process proceeds to the trading logic 600 to determine whether the actual trade floated by P1 can be consummated between P1 and P2 based on credit limits.

Referring back to FIG. 5, if P1 has bilateral closed with respect to P2, the inquiry is then whether P1's order is floated with a clearing account 525. If P1's order is floated with a clearing account, the order is passed to clearing account checks 700 to determine whether the order passes clearing credit account checks 540. If P1's order is not floated with a clearing account, trading is unavailable with P2 and the order will show up as unavailable to P2 on the trading screen. That is, if P1 does not have a clearing account for that order, and bilateral trading is closed with P2, then there is no pathway through which a trade may occur, and trading is unavailable. If P1's order passes clearing account checks, the next step is to determine whether P2's order has an account 535. If not, and bilateral trading is closed with P1, trading is unavailable. If so, then the order is passed to P2's clearing account checks logic 700 to determine whether P2's order passes clearing account checks 545. If the order passes clearing account checks, then P1 and P2 may trade cleared and trading is available pursuant to trading logic 600. If P2's order does not pass clearing account checks, trading is unavailable. Thus the trading availability scheme is summed up as follows. Trading is available (assuming credit limits are met) if: (1) both P1 and P2 have bilateral open with respect to each other, or (2) either P1 or P2 have bilateral closed but both parties have a clearing account open for the order and the order passes clearing account checks. If either P1 or P2 has bilateral closed with respect to the other, and does not have a clearing account available, there is no trading pathway (bilateral is closed and clearing is unavailable).

Assuming trading is available between P1 and P2, the trading logic 600 determines whether the trade is settled bilaterally, cleared or not at all. The first inquiries 610, 615 are whether the order is floated with a clearing account. If not, the trade can only proceed bilaterally, if at all. Thus, the system determined 620 whether P1's order passes P1's bilateral credit checks, i.e., tenor limits and daily dollar limits. If not, there is no trade. If P1's order passes its bilateral credit checks, the next inquiry 630 is whether the order will pass P2's bilateral credit checks. If not, there is no trade. If the order satisfies the tenor limits and daily dollar limits for both P1 and P2, and one or both does not have a clearing account for the order, the trade will be consummated bilaterally.

Assuming both P1 and P2 have an open account in which to clear the order, the order must pass the clearing account checks 700 for both P1 and P2, 625 and 635, respectively. Such clearing checks include, for example, the order size, the credit line available in the clearing account, maximum net long and short limits, and a net trade position balance (calculated from all cleared trades in a trading day) to determine maximum long and short thresholds per trade opportunity. These checks are described in FIG. 7. If clearing account credit checks cannot be met for either or both P1 and P2, the trade will pass to the bilateral credit checks, 620, 630 to determine if the trade can nevertheless proceed bilaterally.

If clearing account credit checks are satisfied, the trade may still be settled either bilaterally or cleared depending upon the parties' preferences. If P1 will only trade cleared with P2 645, the trade will automatically proceed as a cleared trade. If P1 will trade either way, but simply has a preference for one or the other 655, the trade will trade cleared if P1 prefers cleared, but will depend on P2's preferences if P1 prefers bilateral. If P1 prefers bilateral, but P2 will only trade cleared 665, the trade will be settled through clearing. Similarly, if P2 will trade either way but prefers cleared 675, the trade will be settled through clearing. If both P1 and P2 prefer bilateral trading 655, 675, the trade will settle bilaterally even though cleared trading is available to them. Thus, if cleared trading is available based on clearing account credit checks, and either party prefers cleared trading or mandates cleared-only trading, the trade will settle through clearing. If cleared trading is unavailable, or if available but both parties prefer bilateral trading, the trade will settle bilaterally if both parties satisfy bilateral credit limits.

FIG. 7 depicts the credit account checks pathways for P1 or P2, respectively. It should be understood that the checks will proceed along different lines as one party will be making a bid and another party will be making an offer. The clearing account checks are therefore described herein generically. The first step 705 is to determine whether the applicable party has set his clearing account to limit trading such as, for example, suspending or closing the clearing account. This is typically done by a risk manager and may not be known to the trader at the time the order is floated. If the account is suspended or closed, the trade fails the clearing account checks. If the account is open, the next step 710 is whether the clearer has suspended or closed to account. If so, the order fails account checks. If the account is not suspended or closed (either by the party or the clearer), the next step 720 is to determine whether the clearer has set the account as open or liquidate.

Assuming first the account is set to open, the next inquiry is whether the party is making a bid or an offer 730. If it is a bid, it is determined whether the lot quantity exceeds lot size limitations placed on the account 732. If the lot size is not under the limit, the clearing account is unavailable and the order fails clearing account checks. If the lot size is under the limit, the next inquiry 734 is whether the bid exceeds the net account balance. If the bid is not less than the maximum trade long position minus the net account balance, the order will fail the account checks. If the bid is within range, clearing is available on that account.

If the party is making an offer instead of a bid, the inquiries are similar. The first inquiry is whether the lot size meets lot size limits 736. If not, the order fails. If so, the system determines 738 if the offer exceeds the max trade short position plus the net account balance. If not, the trade fails clearing accounts. If so, trading may proceed on a cleared basis with this account (assuming the remaining trade logic is satisfied).

If the clearer has the party set to liquidate, the first inquiry 740 is again whether the party is making a bid or an offer 740. If it is a bid, and the account net balance is long 742, the trade will fails account checks. If the account net balance is short 742, the clearing account checks proceed as described above in steps 732 and 734. If the order is an offer, and the account net balance is short 744, the order fails account checks. If the account net balance is long, the clearing account checks proceed as described above in steps 736 and 738.

It will be understood the present invention can be adapted to other types of clearing account checks.

Another aspect of the system according to preferred embodiments is a user interface that displays parties' trading preferences and settings with respect to each other. In the preferred embodiments, the counterparty filter (see FIG. 4C) illustrates this functionality in a market where clearing is available. For each product in the market relative to the particular counterparty, the filter will identify whether the first party permits bilateral trading with the counterparty (see "My Bilateral") and whether the counterparty permits bilateral trading with the first party (see "Their Bilateral"). In addition, the counterparty filter identifies whether clearing is possible for a particular product. In the "My Clearing" and "Their Clearing" columns, the first party's and counterparty's preferences (i.e., Bilateral or Cleared) are displayed, respectively. It should be noted in this embodiment that even if cleared trading is available, if a party is set to "Preferred Bilateral," it will be displayed as a "Bilateral" setting in the "Clearing" column. Thus, if the first party prefers cleared trades and the counterparty prefers bilateral trades, but nevertheless has a clearing account available for the product, the trade will proceed cleared.

Although the counterparty filter identifies the possible trades that can be made with a specific counterparty for specific products, in the preferred embodiment trading is done anonymously and whether the trade is settled through clearing or bilaterally is not decided until actual trade execution. Thus, the first party may float on offer for a particular product on which both bilateral and cleared trading is available. Whether the trade will be settled bilaterally or through clearing will depend on the preferences of the party to accept the offer. If the party making the offer, for example, has bilateral trading closed with a particular counterparty and at least one of the party or counterparty does not permit cleared trading of the product, the product will show up as red on the trading screen. If trading is possible, the product offer will show up as white. The color coding acts as the means for indicating whether trading is possible. The color coding may also be tied to the particulars of the trade (e.g., notional amount or tenor limits) and those trade particulars compared to a counterparty's bilateral credit limits to determine if trading is possible. Accordingly, if the two parties have bilateral trading open with respect to each other, but the trade would exceed bilateral credit limits, the product offer might still show up as red.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. An electronic exchange system comprising:
a network of data processing terminals, said data processing terminals including at least one exchange server, at least two trading terminals respectively operated by first and second participants and at least one other such terminal operated by a clearing party,
wherein the exchange server comprises:
a database configured for receiving and storing trading preferences of at least one of the first and second participants, said trading preferences comprising one or more methods of settlement; and
a computer-readable program that when run enables the exchange server to:
execute a pre-screening function to determine whether to make an order entered by the first participant executable by the second participant, wherein the pre-screening function comprises evaluating at least two alternative methods of settlement for the order entered by the first participant and determining whether at least one of said alternative methods of settlement is commonly available or commonly acceptable to both participants based upon the trading preferences of both participants.

2. The electronic exchange system of claim 1, wherein the at least two alternative methods of settlement comprise bilateral and clearing methods of settlement, and wherein the exchange server is configured to determine whether a method of settlement is commonly available or commonly acceptable to the participants by:
  performing bilateral credit checks if both participants permit bilateral trading with each other; and
  performing clearing account checks if both participants have a clearing account.

3. The electronic exchange system of claim 2, wherein the exchange server is configured to:
  permit the second participant to execute the order if it is determined that there is at least one commonly available or commonly acceptable method of settlement between the participants; and
  deny the second participant from executing the order if there are no commonly available or commonly acceptable methods of settlement.

4. The electronic exchange system of claim 3, wherein the exchange server is further configured to:
  identify a preferred method of settlement between the participants based on at least one settlement preference established by at least one of the first and second participants; and
  determine whether said preferred method of settlement is commonly available or commonly acceptable to both participants.

5. The electronic exchange system of claim 4, wherein the server exchange is further configured to identify a non-preferred method of settlement that is commonly available or commonly acceptable to both participants when the preferred method of settlement is unavailable or unacceptable to at least one of the participants.

6. The electronic exchange system of claim 5, wherein at least one settlement preference comprises at least one of:
  bilateral only, cleared only, bilateral preferred, cleared preferred, and closed trading preference.

7. The electronic exchange system of claim 6, wherein the exchange server is further configured to enforce at least one default settlement method, said at least one default settlement method being selected by any of an exchange, a clearinghouse, a broker, a brokerage firm, or any third party.

8. The electronic exchange system of claim 7, wherein the at least one settlement preference is established by at least one of the first participant, the second participant, and a third party.

9. The electronic exchange system of claim 8, wherein the third party is selected from the group consisting of an exchange, a clearinghouse, a broker, and a brokerage firm.

10. An electronic trading system comprising:
  one or more exchange servers;
  one or more trading-participant terminals in communication with the exchange server; and
  at least one clearing-participant terminal in communication with at least one of the exchange servers,
  wherein at least one of the exchange servers comprises:
    means for pre-screening an order entered by a first trading-participant to determine whether make the order executable by a second trading-participant, wherein pre-screening an order comprises evaluating at least two alternative methods of settlement for the order and determining whether at least one of said alternative methods of settlement is commonly available or commonly acceptable to both trading-participants; and
    means for determining whether a trading transaction may be consummated after the order has been made executable to the second trading-participant; and
    means for determining how the trading transaction will be settled according to pre-defined trading preferences of the trading-participants.

11. The electronic trading system of claim 10, wherein at least one of the trading-participant terminals comprises an interactive user-interface for providing access to trading parameters and trading preferences of at least one trading-participant.

12. The electronic trading system of claim 11, wherein the interactive user-interface is a counterparty filter.

13. The electronic trading system of claim 12, wherein the one or more exchange servers further comprises means for receiving and matching trade bids and offers.

14. The electronic trading system of claim 13, wherein the means for pre-screening an order entered by a first trading-participant to determine whether to make the order executable by a second trading-participant comprises:
  a computer-readable program that when run enables the one or more servers to:
    determine whether the trading participants permit bilateral trading with each other;
    determine whether the trading participants have clearing accounts; and
    determine whether a clearing account passes a clearing credit check.

15. The electronic trading system of claim 14, wherein the means for determining whether the trading transaction may be consummated comprises:
  a computer-readable program that when run enables the one or more servers to:
    determine whether either of the trading participants has a clearing account;
    run clearing account checks; and
    run bilateral credit checks.

16. The electronic trading system of claim 15, wherein the means for determining how the trading transaction will be settled comprises:
  a computer-readable program that when run enables the one or more servers to:
    compare the pre-defined trading preferences of each of the trading participants; and
    determine how to settle the trading transaction according to the comparison, wherein the pre-defined trading preferences comprise at least one of a bilateral only, a cleared only, a bilateral preferred, a cleared preferred, and a closed trading preference.

17. The electronic trading system of claim 16, wherein the one or more exchange servers further comprises means for settling the trading transaction as at least one of a cleared trade and a bilateral trade.

18. The electronic system of claim 17, wherein at least one of the trading participants is one of a person, an entity, a participant administrator, a company, a broker, a brokerage, and a subsidiary company.

19. A method of pre-screening an order entered by a first party at a first trading terminal to determine whether to make the order executable by a second party at a second trading terminal, the method comprising:
  storing in a database trading preferences of at least the first party and the second party, the trading preferences comprising one or more methods of settlement;
  evaluating by an exchange server at least two alternative methods of settlement for the order entered by the first party;
  determining by the exchange server that at least one of the alternative methods of settlement is at least one of commonly available and acceptable to both parties based upon the trading preferences of both parties; and wherein the exchange server comprises the database and computer-readable instructions for performing the evaluating and determining operations.

20. The method of claim 19, wherein the at least two alternative methods of settlement comprise bilateral and clearing methods of settlement, and wherein determining whether a method of settlement is at least one of commonly available and acceptable to the parties comprises:

performing bilateral credit checks if both parties permit bilateral trading with each other; and performing clearing account checks for the parties if both parties have a clearing account.

21. A method of a second party executing an order entered by a first party at a trading terminal, the method comprising:

storing in a database trading preferences of at least the first party and the second party, the trading preferences comprising one or more methods of settlement;

evaluating by an exchange server at least two alternative methods of settlement for the order entered by the first party;

determining by the exchange server that at least one of the alternative methods of settlement is at least one of commonly available and acceptable to both parties based upon the trading preferences of both parties; and enabling by the exchange server the trade to be executed where it is determined that there is at least one of a commonly available and acceptable settlement method between the parties;

wherein the exchange server comprises the database and computer-readable instructions for performing the evaluating, determining, and enabling operations.

22. The method of claim 21, wherein the at least two alternative methods of settlement comprise bilateral and clearing methods of settlement, and wherein determining whether a method of settlement is at least one of commonly available and acceptable to the parties comprises:

performing bilateral credit checks if both parties permit bilateral trading with each other; and performing clearing account checks for the parties if both parties have a clearing account.

23. The method of claim 21, wherein the step of determining whether a method of settlement is at least one of commonly available and acceptable to the parties comprises:

selecting a method of settlement for a trade between the first party and the second party;

establishing at least one settlement preference by at least one of the first and second parties;

evaluating the at least one settlement preference to identify a preferred method of settlement between the parties; and selecting the preferred method of settlement, where a preferred method of settlement is at least one of commonly available and acceptable to both parties, to settle the trade.

24. The method of claim 23, wherein when the preferred method of settlement is unavailable or unacceptable to at least one of the parties, the method further comprising:

selecting a non-preferred method of settlement, where a non-preferred method of settlement is at least one of the commonly available and acceptable to both parties, to settle the trade.

25. A method of selecting a method of settlement for a trade between a first party and a second party operating a first and second trading terminal, respectively, the method comprising:

establishing at least one settlement preference;

storing the at least one settlement preference in a database;

evaluating by an exchange server the at least one settlement preference to identify a preferred method of settlement between the parties; and selecting by the exchange server the preferred method of settlement, where a preferred method of settlement is at least one of a commonly available and commonly acceptable to both parties, to settle the trade;

wherein the exchange server comprises the database and computer-readable instructions for performing the evaluating and selecting operations.

26. The method of claim 25, wherein when the preferred method of settlement is unavailable or unacceptable to at least one of the parties, the method further comprising:

selecting a non-preferred method of settlement, where a non-preferred method of settlement is at least one of commonly available and acceptable to both parties, to settle the trade.

27. The method of claim 25, wherein the at least one settlement preference comprises at least one of:

bilateral only, cleared only, bilateral preferred, cleared preferred, and closed trading preference.

28. The method of claim 25, further comprising establishing at least one default settlement method, said at least one default settlement method being selected by any of an exchange, a clearinghouse, a broker, a brokerage firm, or any third party.

29. The method of claim 25, wherein the at least one settlement preference is established by at least one of the first party, the second party, and a third party.

30. The method of claim 29, wherein where the preferred method of settlement is unavailable or unacceptable to at least one of the parties, the method further comprising:

selecting a non-preferred method of settlement, where a non-preferred method of settlement is at least one of commonly available and acceptable to both parties, to settle the trade.

31. The method of claim 29, wherein the third party is selected from the group consisting of an exchange, a clearinghouse, a broker, and a brokerage firm.

32. The method of claim 25, further comprising pre-screening and executing an order between the first party and the second party prior to selecting a method of settlement, the method further comprising:

pre-screening the order by determining from a plurality of settlement methods whether there is at least one settlement method that is at least one of commonly available and acceptable to the parties;

making the order executable by the second party where there is at least one of a commonly available and acceptable settlement method between the parties;

the second party attempting to execute the order;

enabling the second party to execute the order where it is determined from a plurality of settlement methods that there is at least one settlement method that is at least one of commonly available acceptable to the parties; and the second party executing the order, thereby generating an executed trade.

33. The method of claim 32, wherein when the preferred method of settlement is unavailable or unacceptable to at least one of the parties, the method further comprising:

selecting a non-preferred method of settlement, where a non-preferred method of settlement is at least one of commonly available and acceptable to both parties, to settle the trade.

34. The method of claim 32, wherein the plurality of settlement methods comprises bilateral and clearing methods of settlement, and wherein determining whether a settlement method is at least one of commonly available and acceptable to the parties comprises:

performing bilateral credit checks if both parties permit bilateral trading with each other; and performing clearing account checks for the parties if both parties have a clearing account.

35. The method of claim 32, wherein the at least one settlement preference comprises at least one of: bilateral only, cleared only, bilateral preferred, cleared preferred, and closed trading preference.

36. The method of claim 32, wherein the third party comprises one or more selected from the group consisting of an exchange, a clearinghouse, and a broker.

37. The method of claim 32, further comprising establishing at least one default settlement method, said at least one default settlement method being selected by any of an exchange, a clearinghouse, a broker, a brokerage firm, or any third party.

* * * * *

UNITED STATES PATENT AND TRADEMARK OFFICE
CERTIFICATE OF CORRECTION

PATENT NO.        : 7,685,051 B2                                              Page 1 of 10
APPLICATION NO.   : 10/444324
DATED             : March 23, 2010
INVENTOR(S)       : Cummings et al.

It is certified that error appears in the above-identified patent and that said Letters Patent is hereby corrected as shown below:

The title page should be deleted and substitute therefor the attached title page.

Drawings:
Replace drawing sheets 1-7 and substitute therefor drawing sheets 1-7 as shown on the attached pages.

Signed and Sealed this

Nineteenth Day of October, 2010

David J. Kappos
*Director of the United States Patent and Trademark Office*

(12) United States Patent
Cummings et al.

(10) Patent No.: US 7,685,051 B2
(45) Date of Patent: Mar. 23, 2010

(54) SYSTEM FOR SETTLING OVER THE COUNTER TRADES

(75) Inventors: Raymond J. Cummings, Decatur, GA (US); David Goone, Glencoe, IL (US)

(73) Assignee: IntercontinentalExchange, Inc., Chicago, IL (US)

( * ) Notice: Subject to any disclaimer, the term of this patent is extended or adjusted under 35 U.S.C. 154(b) by 2034 days.

(21) Appl. No.: 10/444,324

(22) Filed: May 23, 2003

(65) Prior Publication Data

US 2003/0225681 A1    Dec. 4, 2003

Related U.S. Application Data

(60) Provisional application No. 60/385,337, filed on May 31, 2002.

(51) Int. Cl.
*G06Q 40/00*    (2006.01)
(52) U.S. Cl. ..................... 705/37
(58) Field of Classification Search .......... 705/35–45
See application file for complete search history.

(56) References Cited

U.S. PATENT DOCUMENTS

| | | |
|---|---|---|
| 3,581,072 A | 5/1971 | Nymeyer |
| 4,674,044 A | 6/1987 | Kalmus et al. |
| 4,677,552 A | 6/1987 | Sibley, Jr. |
| 4,903,201 A | 2/1990 | Wagner |
| 4,953,085 A | 8/1990 | Atkins |
| 4,980,826 A | 12/1990 | Wagner |
| 5,003,473 A | 3/1991 | Richards |
| 5,077,665 A | 12/1991 | Silverman et al. |
| 5,101,353 A | 3/1992 | Lupien et al. |
| 5,126,936 A | 6/1992 | Champion et al. |
| 5,136,501 A * | 8/1992 | Silverman et al. ............ 705/37 |
| 5,168,446 A | 12/1992 | Wiseman |
| 5,193,056 A | 3/1993 | Boes |
| 5,258,908 A | 11/1993 | Hartheimer et al. |
| 5,270,922 A | 12/1993 | Higgins |
| 5,285,383 A | 2/1994 | Lindsey et al. |
| 5,297,031 A | 3/1994 | Gutterman et al. |
| 5,396,552 A | 3/1995 | Jahn et al. |
| 5,446,885 A | 8/1995 | Moore et al. |
| 5,517,406 A | 5/1996 | Harris et al. |
| 5,557,517 A | 9/1996 | Daughterty, III |
| 5,594,639 A | 1/1997 | Atsumi |
| 5,630,127 A | 5/1997 | Moore et al. |
| 5,802,499 A | 9/1998 | Sampson et al. |
| 5,819,237 A | 10/1998 | Garman |

(Continued)

FOREIGN PATENT DOCUMENTS

EP    0 512 702    11/1992

(Continued)

*Primary Examiner*—Jagdish N Patel
*Assistant Examiner*—Kevin Poe
(74) *Attorney, Agent, or Firm*—DLA Piper LLP (US)

(57) ABSTRACT

A system for automatically determining a trade settlement pathway comprising: receiving trade pathway preferences from a first and second party with respect to each other; wherein the trade is settled through clearing if both parties have available accounts with a clearing firm and the trade satisfies each party's clearing account credit limitations; and wherein the trade is settled bilaterally if at least one party does not have an available clearing account or both parties prefer to settle the trade bilaterally, and the trade satisfies each party's bilateral credit limitations.

37 Claims, 7 Drawing Sheets

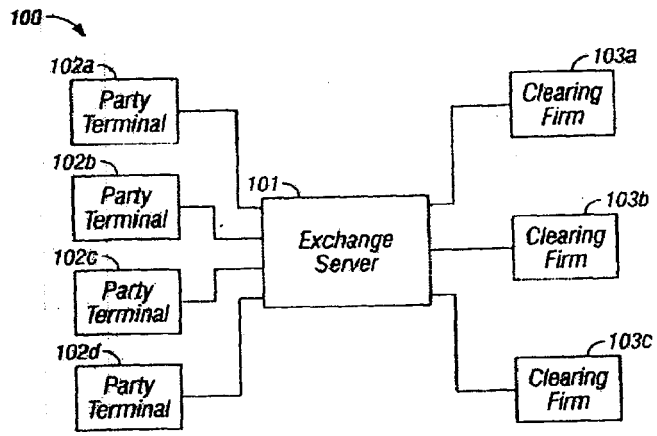

FIG. 4A

Counterparty Filter     Counterparty Filter     Settlements Help     Feedback Lo

Credit Summary

Company Name: View Only Test Company — 401, 404

Market Type: Austrian Power — 403

[Clearing] [Print Preview] [Preferences] — 409

Settlement: Buyer — 405, 408  Acting As The: Buyer — 402

| Their Bilateral | Participant — 406 | Max Days — 407 | My Bilateral | DL On | Daily Limit | Remaining Credit | Credit Floor | Counter Parties | Legal Entity Name |
|---|---|---|---|---|---|---|---|---|---|
| Open | AB RV Gas1 | 10,000 | Open | | 99,000,000 | 99,000,000 | 10,000,000 | 1 | |
| Open | Abba Gas 02 | 10,000 | Open | | 99,000,000 | 99,000,000 | 10,000,000 | 1 | |
| Open | Adidas | 10,000 | Open | | 99,000,000 | 99,000,000 | 10,000,000 | 1 | |
| Open | AEP Energy Services Limited | 10,000 | Open | | 99,000,000 | 99,000,000 | 10,000,000 | 2 | |

FIG. 4B

Counterparty Filter     Counterparty Filter     Settlements Help     Feedback Lo Credit Summary Company Name: View Only Test Company Market Type: Financial Gas —412

[Clearing] [Print Preview] Settlement: Financial 411 [Preferences] Acting As The: Buyer/Seller

| Their Bilateral | Their Clearing | Participant | Max Days | My Bilateral | My Clearing | DL On | Daily Limit | Remaining Credit | Credit Floor | Counter Parties | L |
|---|---|---|---|---|---|---|---|---|---|---|---|
| Open | Cleared | AA RV Gas | 10,000 | Open | Cleared | | 99,000,000 | 99,000,000 | 10,000,000 | 2 | |
| Open | Cleared | AB RV Gas 1 | 10,000 | Open | Cleared | | 99,000,000 | 99,000,000 | 10,000,000 | 2 | |
| Open | Cleared | Abba Gas | 10,000 | Open | Cleared | | 99,000,000 | 99,000,000 | 10,000,000 | 5 | |
| Open | Cleared | Abba Gas 02 | 10,000 | Open | Cleared | | 99,000,000 | 99,000,000 | 10,000,000 | 2 | |
| Open | Bilateral | ABQ Energy Group, LTD | 10,000 | Open | Cleared | | 99,000,000 | 99,000,000 | 10,000,000 | 405 | |
| Open | Bilateral | Adams Resources Mktg Ltd | 10,000 | Open | Cleared | | 99,000,000 | 99,000,000 | 10,000,000 | 405 | |
| Open | Cleared | Adidas | 10,000 | Open | Cleared | | 99,000,000 | 99,000,000 | 10,000,000 | 5 | |
| Closed | Bilateral | ADN Inverstor Services International Ltd. | 0 | Closed | Bilateral | | 0 | 0 | 0 | 2 | |

*FIG. 4C*